US012784974B2

(12) United States Patent
Oishi et al.

(10) Patent No.: US 12,784,974 B2
(45) Date of Patent: Nov. 3, 2026

(54) METHOD OF MANUFACTURING COIL COMPONENT

(71) Applicant: Murata Manufacturing Co., Ltd., Kyoto-fu (JP)

(72) Inventors: Masayuki Oishi, Nagaokakyo (JP); Takashi Sakai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 953 days.

(21) Appl. No.: 18/160,049

(22) Filed: Jan. 26, 2023

(65) Prior Publication Data

US 2023/0238171 A1 Jul. 27, 2023

(30) Foreign Application Priority Data

Jan. 27, 2022 (JP) ................................ 2022-011172

(51) Int. Cl.
*H01F 41/04* (2006.01)
*H01F 17/00* (2006.01)
(Continued)

(52) U.S. Cl.
CPC ....... *H01F 41/041* (2013.01); *H01F 17/0013* (2013.01); *H01F 27/292* (2013.01);
(Continued)

(58) Field of Classification Search
CPC .... H01F 27/292; H01F 17/0013; H01F 27/28; H01F 41/04; H01F 41/046; H01F 41/041; H01F 2027/2809
See application file for complete search history.

(56) References Cited

U.S. PATENT DOCUMENTS

2012/0306607 A1* 12/2012 Jeong .................. H01F 17/0013 336/192
2013/0257576 A1* 10/2013 Arata .................. H01F 17/0013 336/200
(Continued)

FOREIGN PATENT DOCUMENTS

CN 102810382 A 12/2012
CN 111009395 A 4/2020
(Continued)

*Primary Examiner* — Malcolm Barnes
(74) *Attorney, Agent, or Firm* — Studebaker Brackett PLLC

(57) ABSTRACT

A method of manufacturing a coil component which includes an element body including magnetic layers stacked in a first direction and having a surface located in the first direction or a second direction reverse to the first direction, a coil and extended wiring in the element body, and an outer electrode at least on the surface. The method includes forming an unbaked coil wiring layer zone by providing a paste-like unbaked coil wiring layer and a paste-like unbaked magnetic layer in the same layer in the direction orthogonal to the first direction on an upper surface of a sheet-like unbaked magnetic layer with respect to the first direction; and forming an unbaked extended wiring layer zone by providing a paste-like unbaked extended wiring layer and a paste-like unbaked magnetic layer in the same layer in the direction orthogonal to the first direction without providing a sheet-like unbaked magnetic layer.

20 Claims, 11 Drawing Sheets

(51) Int. Cl.
*H01F 27/28* (2006.01)
*H01F 27/29* (2006.01)

(52) U.S. Cl.
CPC ... *H01F 41/046* (2013.01); *H01F 2027/2809* (2013.01); *H01F 41/04* (2013.01)

(56) References Cited

U.S. PATENT DOCUMENTS

| | | | | |
|---|---|---|---|---|
| 2015/0014042 A1* | 1/2015 | Noguchi | H05K 1/165 | |
| | | | 174/262 | |
| 2018/0122555 A1* | 5/2018 | Kim | H01F 27/292 | |
| 2020/0111603 A1* | 4/2020 | Sato | H01F 27/292 | |
| 2021/0304954 A1* | 9/2021 | Sato | H01F 41/043 | |

FOREIGN PATENT DOCUMENTS

| | | | | |
|---|---|---|---|---|
| CN | 111986876 | A | | 11/2020 |
| CN | 112582130 | A | | 3/2021 |
| JP | H11-265823 | A | | 9/1999 |
| JP | 2004039957 | A | * | 2/2004 |
| JP | 2004-142964 | A | | 5/2004 |
| JP | 2010-080594 | A | | 4/2010 |
| JP | 2014-082280 | A | | 5/2014 |
| JP | 2016-162892 | A | | 9/2016 |
| JP | 2019125607 | A | * | 7/2019 |

* cited by examiner

METHOD OF MANUFACTURING COIL COMPONENT

CROSS-REFERENCE TO RELATED APPLICATION

This application claims benefit of priority to Japanese Patent Application No. 2022-011172, filed Jan. 27, 2022, the entire content of which is incorporated herein by reference.

BACKGROUND

Technical Field

The present disclosure relates to a method of manufacturing a coil component.

Background Art

Among methods of manufacturing a coil component, conventionally, a method disclosed in Japanese Unexamined Patent Application Publication No. 2004-142964 has been becoming mainstream because reduction in electrical resistance of a coil has been demanded. In this manufacturing method, conductive paste for inner electrode is applied onto a green sheet and insulator paste is thereafter applied onto regions on the green sheet where the conductive paste does not exist, in order that electrical resistance of the conductive paste (coil) may be reduced by ensuring of a thickness of the conductive paste. This step is iterated a plurality of times, so that a multilayer body is formed.

SUMMARY

However, such a method of manufacturing a coil component as the conventional method has a problem in that labors in steps are increased in number because preparation of the green sheet is required each time.

Accordingly, the present disclosure provides a method of manufacturing a coil component that enables reduction in electrical resistance and simplification of steps.

A method of manufacturing a coil component according to one aspect of the present disclosure is as follows. The coil component includes an element body including a plurality of magnetic layers stacked in a first direction and having a surface located in the first direction or a second direction that is reverse to the first direction; a coil provided in the element body; extended wiring provided in the element body, electrically connected to an end portion of the coil, extending at least in the first direction, and exposed from the surface of the element body; and an outer electrode provided at least on the surface of the element body and connected to the extended wiring. The coil includes a coil wiring layer extending in a direction that is orthogonal to the first direction. The extended wiring includes an extended wiring layer placed in a layer that differs from the coil wiring layer with respect to the first direction. The method includes forming an unbaked coil wiring layer zone by providing a paste-like unbaked coil wiring layer and a paste-like unbaked magnetic layer in the same layer in the direction that is orthogonal to the first direction on an upper surface of a sheet-like unbaked magnetic layer with respect to the first direction; and forming an unbaked extended wiring layer zone by providing a paste-like unbaked extended wiring layer and a paste-like unbaked magnetic layer in the same layer in the direction that is orthogonal to the first direction without providing a sheet-like unbaked magnetic layer.

Herein, a coil is spirally wound along an axial direction and the number of turns of the coil may be one or more or may be less than one. Extended wiring makes a connection between the coil and the outer electrode and is not included in the number of turns of the coil.

According to the aspect, a thickness of the unbaked coil wiring layer can be increased because the paste-like unbaked coil wiring layer and the paste-like unbaked magnetic layer are provided in the same layer on the sheet-like unbaked magnetic layer. Thus, a thickness of the coil wiring layer can be increased so that electrical resistance of the coil can be reduced.

Meanwhile, steps can be simplified and manufacturing is facilitated because the paste-like unbaked extended wiring layer and the paste-like unbaked magnetic layer are provided in the same layer without provision of the sheet-like unbaked magnetic layer. Herein, the extended wiring extends at least in the first direction from the end portion of the coil, is exposed from the surface of the element body that is located in the first direction or the second direction, and accordingly, does not mainly extend in a direction that is orthogonal to the first direction, unlike the coil wiring layer. Therefore, there is little necessity to increase a thickness of the extended wiring layer in order to reduce electrical resistance of the extended wiring. Thus, the zone for which there is little necessity to reduce the electrical resistance can be manufactured by simple steps.

Accordingly, the method of manufacturing a coil component that enables reduction in the electrical resistance and simplification of the steps can be implemented by manufacturing of the unbaked coil wiring layer zone, which entails necessity to reduce the electrical resistance, in steps for increasing the thickness and manufacturing of the unbaked extended wiring layer zone, which entails little necessity to reduce the electrical resistance, in the simple steps.

Preferably, one embodiment of the method of manufacturing the coil component further incudes stacking the unbaked coil wiring layer zone and the unbaked extended wiring layer zone in the first direction.

According to the embodiment, the unbaked coil wiring layer zone and the unbaked extended wiring layer zone can be combined after being manufactured in the different steps and thus a plurality of types of unbaked coil wiring layer zones differing in inductance value can be manufactured while the unbaked extended wiring layer zone can be shared.

Preferably, in one embodiment of the method of manufacturing the coil component, the forming the unbaked extended wiring layer zone is carried out after the forming the unbaked coil wiring layer zone, and the forming the unbaked extended wiring layer zone includes providing the paste-like unbaked extended wiring layer on an upper surface of the paste-like unbaked coil wiring layer.

According to the embodiment, the unbaked coil wiring layer zone is formed before formation of the unbaked extended wiring layer zone and thus variation in electrical characteristics (such as inductance value) can be reduced with stabilization of a shape of the unbaked coil wiring layer.

Preferably, in one embodiment of the method of manufacturing the coil component, the surface of the element body includes a first surface located in the second direction, the extended wiring includes first extended wiring and second extended wiring, the outer electrode includes a first outer electrode and a second outer electrode, the first extended wiring and the second extended wiring are placed in the same layer, the first extended wiring and the coil are sequentially placed in the first direction, the first extended wiring is exposed from the first surface of the element body and is connected to the first outer electrode, the second extended wiring is exposed from the first surface of the element body and is connected to the second outer electrode, and the first surface of the element body configures a mount surface.

Herein, "the first extended wiring and the coil are sequentially placed in the first direction" does not refer to order of manufacture of the first extended wiring and the coil but refers to order of placement of the first extended wiring and the coil. According to the embodiment, the plurality of magnetic layers of the element body are stacked in a direction that is orthogonal to the mount surface of the element body (so-called longitudinal stacking), so that flexure strength at time of mounting of the coil component is increased in comparison with a case where the plurality of magnetic layers are stacked in a direction that is parallel to the mount surface (so-called transverse stacking).

Preferably, in one embodiment of the method of manufacturing the coil component, the surface of the element body includes a first surface located in the second direction and a second surface located in the first direction. The element body includes a third surface located between the first surface and the second surface. The extended wiring includes first extended wiring and second extended wiring. The outer electrode includes a first outer electrode and a second outer electrode. The first extended wiring, the coil, and the second extended wiring are sequentially placed in the first direction. The first extended wiring is exposed from the first surface of the element body and is connected to the first outer electrode. The second extended wiring is exposed from the second surface of the element body and is connected to the second outer electrode, and the third surface of the element body configures a mount surface.

Herein, "the first extended wiring, the coil, and the second extended wiring are sequentially placed in the first direction" does not refer to order of manufacture of the first extended wiring, the coil, and the second extended wiring but refers to order of placement of the first extended wiring, the coil, and the second extended wiring. According to the embodiment, the plurality of magnetic layers of the element body are stacked in the direction that is parallel to the mount surface of the element body (so-called transverse stacking), so that the coil component which can be more easily designed so as to decrease in stray capacitance between the coil and the extended wiring and the outer electrodes and which is superior in high frequency characteristics can be implemented, in comparison with a case where the plurality of magnetic layers are stacked in a direction that is orthogonal to the mount surface (so-called longitudinal stacking).

Preferably, in one embodiment of the method of manufacturing the coil component, the extended wiring includes a plurality of the extended wiring layers stacked in the first direction, and a first zone in the extended wiring in contact with the coil and a second zone in the extended wiring in contact with the outer electrode do not overlap viewed from the first direction.

According to the embodiment, an extended wiring layer deviated in a direction that is orthogonal to the first direction exists among the plurality of extended wiring layers. Thus, exfoliation among the plurality of magnetic layers or occurrence of cracks can be reduced.

Preferably, in one embodiment of the method of manufacturing the coil component, the extended wiring includes a plurality of the extended wiring layers stacked in the first direction, and a first zone in the extended wiring in contact with the coil and a second zone in the extended wiring in contact with the outer electrode overlap viewed from the first direction.

According to the embodiment, at least two extended wiring layers that overlap viewed from the first direction exist among the plurality of extended wiring layers. Thus, an electrical path of the extended wiring can be made shorter so that electrical resistance of the extended wiring can be reduced.

Preferably, in one embodiment of the method of manufacturing the coil component, the extended wiring includes a plurality of the extended wiring layers stacked in the first direction, and portions of the plurality of extended wiring layers that extend in the first direction overlap for all the extended wiring layers, viewed from the first direction.

According to the embodiment, the plurality of extended wiring layers are linearly placed along the first direction. Thus, the electrical path of the extended wiring can be made shorter so that the electrical resistance of the extended wiring can be further reduced.

According to the method of manufacturing the coil component that is one aspect of the present disclosure, the reduction in the electrical resistance and the simplification of the steps can be attained.

DETAILED DESCRIPTION

Figure 1:
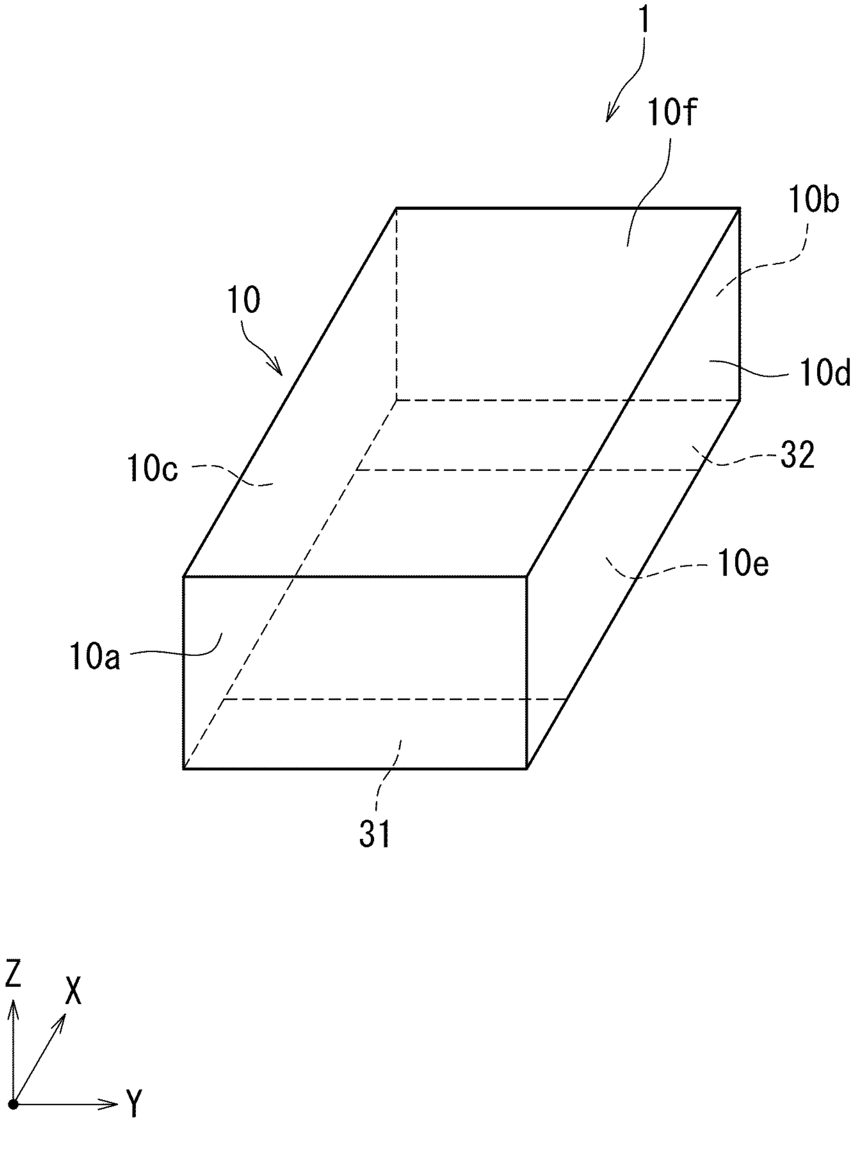
FIG. 1 is a perspective view illustrating a first embodiment of a coil component.

Hereinbelow, a method of manufacturing a coil component that is one aspect of the present disclosure will be described in detail with reference to embodiments illustrated in the drawings. Incidentally, the drawings include schematic ones and actual sizes and proportions are not necessarily reflected therein.

First Embodiment (Configuration)

Figure 2:
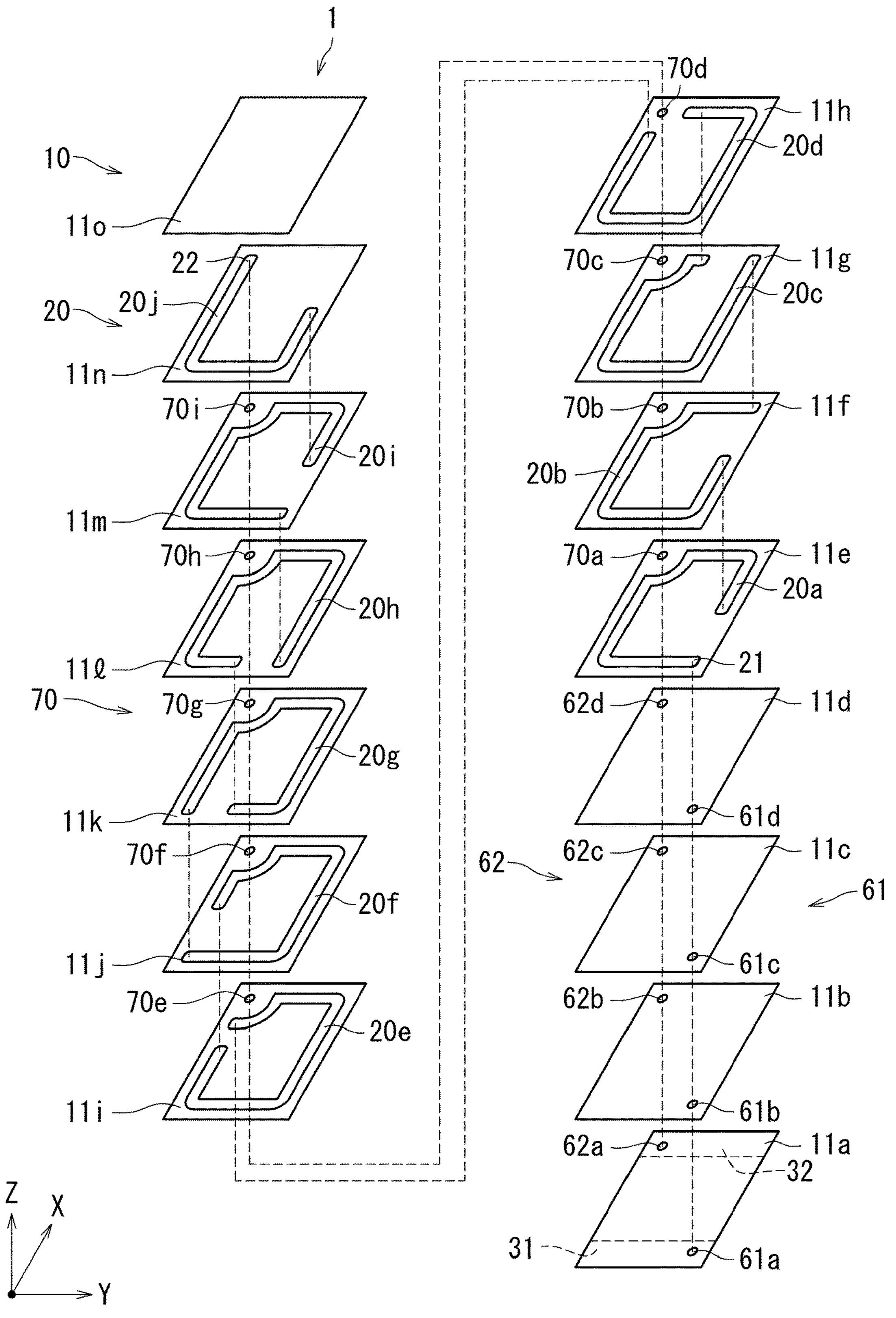
FIG. 2 is an exploded perspective view of the coil component.

FIG. 1 is a perspective view illustrating a first embodiment of a coil component. FIG. 2 is an exploded perspective view of the coil component. As illustrated in FIGS. 1 and 2, a coil component 1 includes an element body 10, a coil 20 provided in the element body 10, first extended wiring 61 and second extended wiring 62 that are provided in the element body 10 and that are electrically connected to a first end portion 21 and a second end portion 22 of the coil 20, and a first outer electrode 31 and a second outer electrode 32 that are provided on a surface of the element body 10 and that are connected to the first extended wiring 61 and the second extended wiring 62.

The coil component 1 is electrically connected to wiring of a circuit board not illustrated via the first and second outer electrodes 31 and 32. The coil component 1 is used as a noise reduction filter, for instance, and is used for electronic equipment such as a personal computer, a DVD player, a digital camera, a TV, a cellular phone, or car electronics.

The element body 10 has a length, a width, and a height. The element body 10 is substantially shaped like a rectangular parallelepiped. The element body 10 has a first end surface 10*a* and a second end surface 10*b* that exist on both end sides with respect to a length direction, a first side surface 10*c* and a second side surface 10*d* that exist on both end sides with respect to a width direction, and a bottom surface 10*e* and a top surface 10*f* that exist on both end sides with respect to a height direction. That is, surfaces of the element body 10 include the first end surface 10*a* and the second end surface 10*b*, the first side surface 10*c* and the second side surface 10*d*, and the bottom surface 10*e* and the top surface 10*f*.

Incidentally, as illustrated in the drawings, a direction that is the length direction (longitudinal direction) of the element body 10 and that is directed from the first end surface 10*a* toward the second end surface 10*b* will be referred to below as X direction for convenience of description. A direction that is the width direction of the element body 10 and that is directed from the first side surface 10*c* toward the second side surface 10*d* will be referred to as Y direction. A direction that is the height direction of the element body 10 and that is directed from the bottom surface 10*e* toward the top surface 10*f* will be referred to as Z direction. A forward direction in Z direction may be represented as an upper side and a reverse direction in Z direction may be represented as a lower side. X direction, Y direction, and Z direction are directions that are orthogonal to one another and the directions sequenced in order of X, Y, and Z configure a left-handed system.

The element body 10 includes a plurality of magnetic layers 11*a* to 11*o*. The plurality of magnetic layers 11*a* to 11*o* are sequentially stacked in Z direction. Thicknesses of the magnetic layers 11*a* to 11*o* are 5 μm or greater and 30 μm or smaller (i.e., from 5 to 30 μm), for instance. The magnetic layers 11*a* to 11*o* are made of magnetic material such as Ni—Cu—Zn-based ferrite material, for instance. Alternatively, the magnetic layers 11*a* to 11*o* are made of metallic magnetics such as powder with metallic magnetism of Fe, Si, Fe—Si—Cr, Fe—Si—Al, Fe—Ni—Al, Fe—Cr—Al, amorphous, or the like. Incidentally, the element body 10 may partially include a nonmagnetic layer.

Herein, in the first embodiment, Z direction corresponds to an example of "first direction" disclosed in the claims. A reverse direction to Z direction corresponds to an example of "second direction" disclosed in the claims. The bottom surface 10*e* and the top surface 10*f* correspond to an example of "surface located in the first direction or the second direction" disclosed in the claims. The bottom surface 10*e* corresponds to an example of "first surface located in the second direction" disclosed in the claims. The top surface 10*f* corresponds to an example of "second surface located in the first direction" disclosed in the claims.

The first outer electrode 31 covers an end portion of the bottom surface 10*e* of the element body 10 on a side of the first end surface 10*a*. The second outer electrode 32 covers an end portion of the bottom surface 10*e* of the element body 10 on a side of the second end surface 10*b*. The first outer electrode 31 is electrically connected to the first end portion 21 of the coil 20 and the second outer electrode 32 is electrically connected to the second end portion 22 of the coil 20.

The coil 20 is spirally wound along Z direction. Though the coil 20 is wound by one or more turns, the coil 20 may be wound by less than one turn. The coil 20 is made of conductive material such as Ag or Cu, for instance. The first end portion 21 of the coil 20 is located on a lower side with respect to Z direction. The second end portion 22 of the coil 20 is located on an upper side with respect to Z direction.

The coil 20 includes a plurality of coil wiring layers 20*a* to 20*j*. The plurality of coil wiring layers 20*a* to 20*j* are sequentially stacked in Z direction. The plurality of coil wiring layers 20*a* to 20*j* form a spiral along Z direction by being serially connected with via wiring layers, not illustrated, interposed therebetween. The coil 20 includes the via wiring layers connected to the coil wiring layers 20*a* to 20*j*.

The coil wiring layers 20*a* to 20*j* are respectively placed on the magnetic layers 11*e* to 11*n*. The coil wiring layers 20*a* to 20*j* extend along directions that are orthogonal to Z direction. The coil wiring layers 20*a* to 20*j* are each formed in a shape wound by less than one turn on a plane. A thickness of each of the coil wiring layers 20*a* to 20*j* is 10 μm or greater and 40 μm or smaller (i.e., from 10 μm to 40 μm), for instance. The coil wiring layers 20*a* to 20*j* may be each wound by one or more turns.

The first extended wiring 61 and the second extended wiring 62 make electrical connections between the coil 20 and the first and second outer electrodes 31 and 32. That is, the first extended wiring 61 and the second extended wiring 62 are not included in the number of turns of the coil 20.

The first extended wiring 61 is electrically connected to the first end portion 21 of the coil 20, extends at least in Z direction, and is exposed from the bottom surface 10*e* of the element body 10. The first extended wiring 61 is exposed from the bottom surface 10*e* of the element body 10 and is connected to the first outer electrode 31.

The first extended wiring 61 includes a plurality of extended wiring layers 61*a* to 61*d*. The plurality of extended wiring layers 61*a* to 61*d* are sequentially stacked in Z direction. The plurality of extended wiring layers 61*a* to 61*d* are formed in a shape of a column along Z direction by being serially connected. The plurality of extended wiring layers 61*a* to 61*d* are placed in layers that differ from the coil wiring layers 20*a* to 20*j* with respect to Z direction. A thickness of each of the extended wiring layers 61*a* to 61*d* is 30 μm, for instance, and may be thinner than the thickness of each of the coil wiring layers 20*a* to 20*j*. The extended wiring layers 61*a* to 61*d* each include a portion extending in Z direction. Incidentally, the extended wiring layers 61*a* to 61*d* each may include a portion extending in a direction that is orthogonal to Z direction.

The second extended wiring 62 is electrically connected to the second end portion 22 of the coil 20, extends at least in Z direction, and is exposed from the bottom surface 10*e* of the element body 10. The second extended wiring 62 is exposed from the bottom surface 10*e* of the element body 10 and is connected to the second outer electrode 32.

The second extended wiring 62 includes a plurality of extended wiring layers 62*a* to 62*d*. The plurality of extended wiring layers 62*a* to 62*d* are sequentially stacked in Z direction. The plurality of extended wiring layers 62*a* to 62*d* are formed in a shape of a column along Z direction by being serially connected. The plurality of extended wiring layers 62*a* to 62*d* are placed in layers that differ from the coil wiring layers 20*a* to 20*j* with respect to Z direction. A thickness of each of the extended wiring layers 62*a* to 62*d* is 30 μm, for instance, and may be thinner than the thickness of each of the coil wiring layers 20*a* to 20*j*. The extended wiring layers 62*a* to 62*d* each include a portion extending in Z direction. Incidentally, the extended wiring layers 62*a* to 62*d* each may include a portion extending in a direction that is orthogonal to Z direction.

The second extended wiring 62 is connected to the second end portion 22 of the coil 20 via connection wiring 70. The connection wiring 70 includes a plurality of connection wiring layers 70*a* to 70*i*. The plurality of connection wiring layers 70*a* to 70*i* are sequentially stacked in Z direction. The plurality of connection wiring layers 70*a* to 70*i* are formed in a shape of a column along Z direction by being serially connected. The plurality of connection wiring layers 70*a* to 70*i* are placed in the same layers as the coil wiring layers 20*a* to 20*j* with respect to Z direction.

The first extended wiring 61 and the second extended wiring 62 are placed in the same layers. The first extended wiring 61 and the coil 20 are sequentially placed in Z direction. The second extended wiring 62 and the coil 20 are sequentially placed in Z direction.

In this embodiment, the bottom surface 10*e* of the element body 10 configures a mount surface that is to be mounted on a mount substrate not illustrated. Accordingly, the plurality of magnetic layers 11*a* to 11*o* of the element body 10 are stacked in a direction that is orthogonal to the mount surface of the element body 10 (so-called longitudinal stacking), so that flexure strength of the coil component 1 at time of mounting is increased in comparison with a case where the plurality of magnetic layers 11*a* to 11*o* are stacked in a direction that is parallel to the mount surface (so-called transverse stacking).

(Manufacturing Method)

Subsequently, a method of manufacturing the coil component 1 will be described with use of FIGS. 3A to 3D and FIGS. 4A to 4C. FIGS. 3A to 3D and FIGS. 4A to 4C illustrate YZ sections in FIG. 2.

Figure 3A:
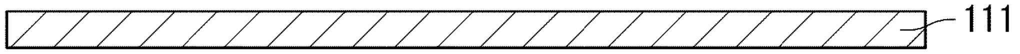
FIG. 3A is a sectional view illustrating a method of manufacturing the coil component.

As illustrated in FIG. 3A, a sheet-like first unbaked magnetic layer 111 is prepared. The first unbaked magnetic layer 111 is a green sheet and is a magnetic layer (corresponding to the magnetic layer 11*e* of FIG. 2) that is in a state before baking.

Figure 3B:
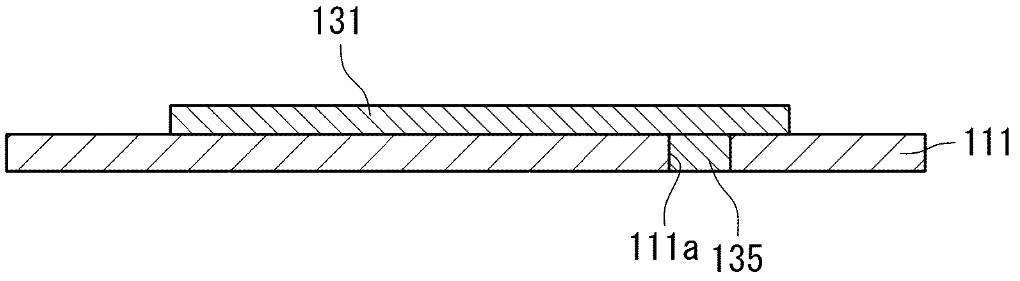
FIG. 3B is a sectional view illustrating the method of manufacturing the coil component.

As illustrated in FIG. 3B, a via hole 111*a* is formed by laser processing at a specified site on the first unbaked magnetic layer 111. Then, a paste-like first unbaked coil wiring layer 131 is provided on an upper surface of the first unbaked magnetic layer 111 with respect to Z direction. For instance, the first unbaked coil wiring layer 131 is formed by screen printing on the upper surface of the first unbaked magnetic layer 111. At this time, an unbaked via wiring layer 135 is formed in the via hole 111*a*. The first unbaked coil wiring layer 131 is a coil wiring layer (corresponding to the coil wiring layer 20*a* of FIG. 2) that is in a state before baking and the unbaked via wiring layer 135 is a via wiring layer that is in a state before baking.

Figure 3C:
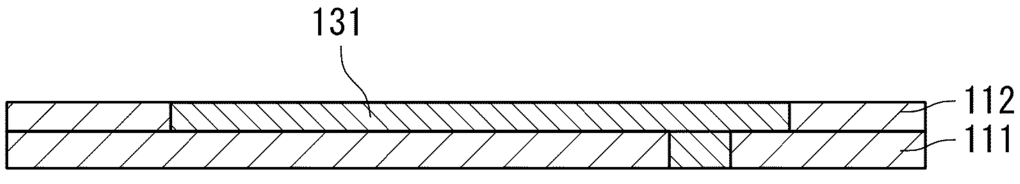
FIG. 3C is a sectional view illustrating the method of manufacturing the coil component.

As illustrated in FIG. 3C, a paste-like second unbaked magnetic layer 112 is provided on the upper surface of the first unbaked magnetic layer 111 and in the same layer as the first unbaked coil wiring layer 131 in a direction that is orthogonal to Z direction. That is, the second unbaked magnetic layer 112 is provided in a region on the first unbaked magnetic layer 111 where the first unbaked coil wiring layer 131 is absent and in the same layer as the first unbaked coil wiring layer 131. For instance, the second unbaked magnetic layer 112 is formed by screen printing on the upper surface of the first unbaked magnetic layer 111. The second unbaked magnetic layer 112 is a magnetic layer that is in a state before baking. Illustration of the magnetic layer corresponding to the second unbaked magnetic layer 112 is omitted in FIG. 2. Incidentally, the second unbaked magnetic layer 112 is provided after provision of the first unbaked coil wiring layer 131, whereas the first unbaked coil wiring layer 131 may be provided after provision of the second unbaked magnetic layer 112.

Figure 3D:
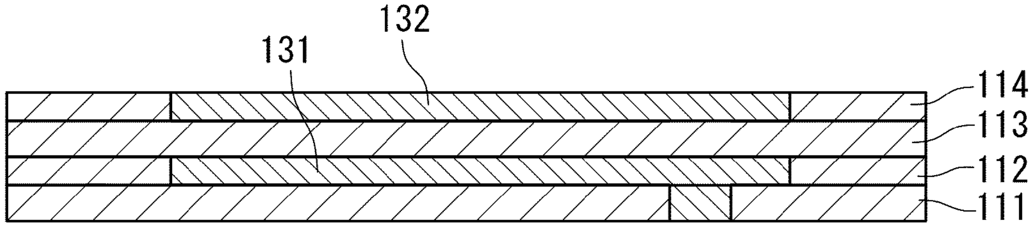
FIG. 3D is a sectional view illustrating the method of manufacturing the coil component.

As illustrated in FIG. 3D, a multilayer sheet body is formed by provision of a paste-like second unbaked coil wiring layer 132 and a paste-like fourth unbaked magnetic layer 114 in the same layer on a sheet-like third unbaked magnetic layer 113 and the multilayer sheet body is provided on the first unbaked coil wiring layer 131 and on the second unbaked magnetic layer 112. The third unbaked magnetic layer 113 is a green sheet and is a magnetic layer (corresponding to the magnetic layer 11*f* of FIG. 2) that is in a state before baking. The second unbaked coil wiring layer 132 is a coil wiring layer (corresponding to the coil wiring layer 20*b* of FIG. 2) that is in a state before baking. The fourth unbaked magnetic layer 114 is a magnetic layer whose illustration is omitted in FIG. 2 and which is in a state before baking.

After that, steps of FIGS. 3A to 3D are iterated, so that an unbaked coil wiring layer zone made of unbaked coil wiring layers corresponding to the coil wiring layers 20*a* to 20*j* of FIG. 2 and unbaked magnetic layers corresponding to the magnetic layers 11*e* to 11*o* of FIG. 2 is formed. Thus, the unbaked coil wiring layer zone is formed by a technique for absorbing differences in level, caused by the unbaked coil wiring layers, by the paste-like unbaked magnetic layers (to be referred to below as flat technique). Unbaked connection wiring layers corresponding to the connection wiring layers 70*a* to 70*i* of FIG. 2 are formed as with the above, though not illustrated.

Figure 4A:
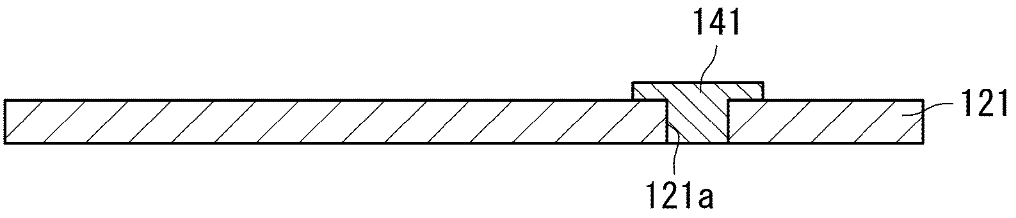
FIG. 4A is a sectional view illustrating the method of manufacturing the coil component.

As illustrated in FIG. 4A, a paste-like first unbaked extended wiring layer 141 and a paste-like first unbaked magnetic layer 121 are provided in the same layer in a direction that is orthogonal to Z direction, without provision of such a sheet-like unbaked magnetic layer as described above. For instance, the first unbaked magnetic layer 121 including a through-hole 121*a* is formed by screen printing and the first unbaked extended wiring layer 141 is thereafter formed by screen printing so as to plug the through-hole 121*a*. The first unbaked magnetic layer 121 is a magnetic layer (corresponding to the magnetic layer 11*a* of FIG. 2) that is in a state before baking. The first unbaked extended wiring layer 141 is an extended wiring layer (corresponding to the extended wiring layer 61*a* of FIG. 2) that is in a state before baking.

Figure 4B:
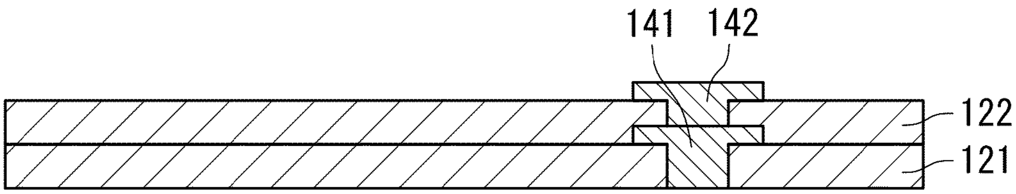
FIG. 4B is a sectional view illustrating the method of manufacturing the coil component.

As illustrated in FIG. 4B, a paste-like second unbaked extended wiring layer 142 and a paste-like second unbaked magnetic layer 122 are provided in the same layer on the first unbaked magnetic layer 121 and on the first unbaked extended wiring layer 141. At this time, the second unbaked extended wiring layer 142 is made to be in contact with the first unbaked extended wiring layer 141. The second unbaked magnetic layer 122 is a magnetic layer (corresponding to the magnetic layer 11*b* of FIG. 2) that is in a state before baking. The second unbaked extended wiring layer 142 is an extended wiring layer (corresponding to the extended wiring layer 61*b* of FIG. 2) that is in a state before baking.

Figure 4C:
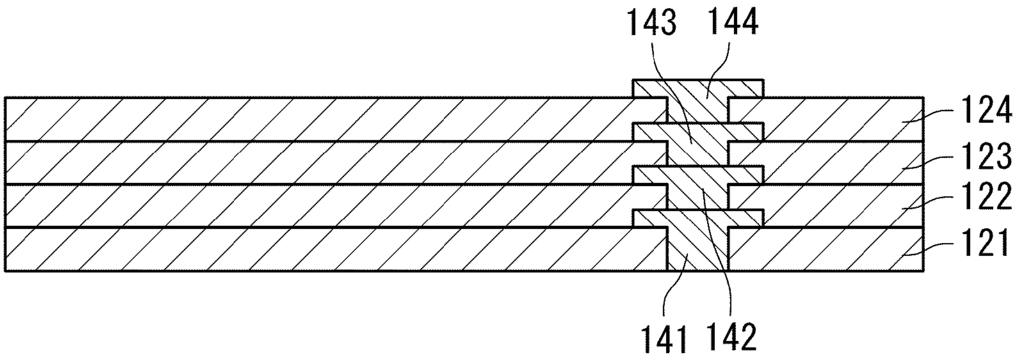
FIG. 4C is a sectional view illustrating the method of manufacturing the coil component.

As illustrated in FIG. 4C, a paste-like third unbaked extended wiring layer 143 and a paste-like third unbaked magnetic layer 123 are provided in the same layer on the second unbaked magnetic layer 122 and on the second unbaked extended wiring layer 142. At this time, the third unbaked extended wiring layer 143 is made to be in contact with the second unbaked extended wiring layer 142. The third unbaked magnetic layer 123 is a magnetic layer (corresponding to the magnetic layer 11*c* of FIG. 2) that is in a state before baking. The third unbaked extended wiring layer 143 is an extended wiring layer (corresponding to the extended wiring layer 61*c* of FIG. 2) that is in a state before baking.

After that, a paste-like fourth unbaked extended wiring layer 144 and a paste-like fourth unbaked magnetic layer 124 are provided in the same layer on the third unbaked magnetic layer 123 and on the third unbaked extended wiring layer 143. At this time, the fourth unbaked extended wiring layer 144 is made to be in contact with the third unbaked extended wiring layer 143. The fourth unbaked magnetic layer 124 is a magnetic layer (corresponding to the magnetic layer 11*d* of FIG. 2) that is in a state before baking. The fourth unbaked extended wiring layer 144 is an extended wiring layer (corresponding to the extended wiring layer 61*d* of FIG. 2) that is in a state before baking. Thus, an unbaked extended wiring layer zone on a side of the first extended wiring 61 that is made of the unbaked extended wiring layers corresponding to the extended wiring layers 61*a* to 61*d* of the first extended wiring 61 of FIG. 2 and the unbaked magnetic layers corresponding to the magnetic layers 11*a* to 11*d* of FIG. 2 is formed.

In FIGS. 4A to 4C, unbaked extended wiring layers corresponding to the extended wiring layers 62*a* to 62*d* of the second extended wiring 62 of FIG. 2 are formed as with the above in the unbaked magnetic layers corresponding to the magnetic layers 11*a* to 11*d* of FIG. 2, though not illustrated. Thus, an unbaked extended wiring layer zone on a side of the second extended wiring 62 is formed. In this embodiment, the unbaked extended wiring layer zone on the side of the first extended wiring 61 and the unbaked extended wiring layer zone on the side of the second extended wiring 62 are formed in a zone in the same layers. The unbaked extended wiring layer zones are formed by so-called printing lamination technique.

After that, a multilayer body is formed by stacking of the unbaked coil wiring layer zone and the unbaked extended wiring layer zones in Z direction. Then, the element body 10, the coil 20, the first extended wiring 61, and the second extended wiring 62 are formed by baking of the multilayer body. After that, the first outer electrode 31 and the second outer electrode 32 are formed on the surface of the element body 10, so that the coil component 1 is manufactured.

According to the embodiment, thicknesses of the unbaked coil wiring layers can be increased because the paste-like unbaked coil wiring layers and the paste-like unbaked magnetic layers are provided in the same layers on the sheet-like unbaked magnetic layers. Thus, the thicknesses of the coil wiring layers can be increased so that the electrical resistance of the coil can be reduced. Meanwhile, the unbaked coil wiring layers can be formed in rectangular shapes, for instance, in a section that is orthogonal to an extending direction of the unbaked coil wiring layers because the paste-like unbaked coil wiring layers and the paste-like unbaked magnetic layers are provided in the same layers on the sheet-like unbaked magnetic layers. Thus, shapes of the coil wiring layers can be made stable.

Meanwhile, steps can be simplified and manufacturing is facilitated because the paste-like unbaked extended wiring layers and the paste-like unbaked magnetic layers are provided in the same layers without provision of the sheet-like unbaked magnetic layers. Herein, the extended wiring extends at least in Z direction from the end portion of the coil, is exposed from the surface of the element body that is in the reverse direction to Z direction, and accordingly, does not mainly extend in a direction that is orthogonal to Z direction, unlike the coil wiring layers. Therefore, there is little necessity to increase a thickness of the extended wiring layer in order to reduce electrical resistance of the extended wiring. Thus, the zone for which there is little necessity to reduce the electrical resistance can be manufactured by simple steps.

Further, necessity of opening of via holes on green sheets and filling of conductive paste therein is eliminated and reliability in electrical connection is increased because the paste-like unbaked extended wiring layers and the paste-like unbaked magnetic layers are provided in the same layers without provision of sheet-like unbaked magnetic layers. Furthermore, through-holes are not provided by laser on the unbaked magnetic layers, thus a degree of freedom in size of the through-holes is heightened and a degree of freedom in magnitude of area of a connection surface between the extended wiring layers adjoining in a stacking direction is heightened.

Accordingly, the method of manufacturing a coil component that enables reduction in the electrical resistance and simplification of the steps can be implemented by manufacturing of the unbaked coil wiring layer zone, which entails necessity to reduce the electrical resistance, in steps for increasing the thickness and manufacturing of the unbaked extended wiring layer zones, which entail little necessity to reduce the electrical resistance, in the simple steps.

According to the embodiment, a step of stacking the unbaked coil wiring layer zone and the unbaked extended wiring layer zones in Z direction is provided. Accordingly, the unbaked coil wiring layer zone and the unbaked extended wiring layer zones can be combined after being manufactured in the different steps and thus a plurality of types of unbaked coil wiring layer zones differing in inductance value can be manufactured while the unbaked extended wiring layer zones can be shared.

Herein, another manufacturing method will be described instead of the manufacturing method in which the unbaked coil wiring layer zone and the unbaked extended wiring layer zones are combined after being manufactured in the different steps.

Initially, after the step of forming the unbaked coil wiring layer zone, a step of forming the unbaked extended wiring layer zones is carried out. In addition, the step of forming the unbaked extended wiring layer zones includes providing a paste-like unbaked extended wiring layer on an upper surface of a paste-like unbaked coil wiring layer. Accordingly, the unbaked coil wiring layer zone is formed before formation of the unbaked extended wiring layer zones and thus variation in electrical characteristics (such as inductance value) can be reduced with stabilization of the shapes of the unbaked coil wiring layers.

To be specific, in case where the coil wiring layers 20*a* to 20*j* and the extended wiring layers 61*a* to 61*d* and 62*a* to 62*d* are sequentially stacked in the reverse direction to Z direction (from the upper side toward the lower side) in FIG. 2, the step of forming the unbaked extended wiring layer zones includes providing a paste-like unbaked extended wiring layer corresponding to the extended wiring layer 61*d* of FIG. 2 on an upper surface of a paste-like unbaked coil wiring layer corresponding to the coil wiring layer 20*a* of FIG. 2.

(Configuration of Extended Wiring)

Figure 5:
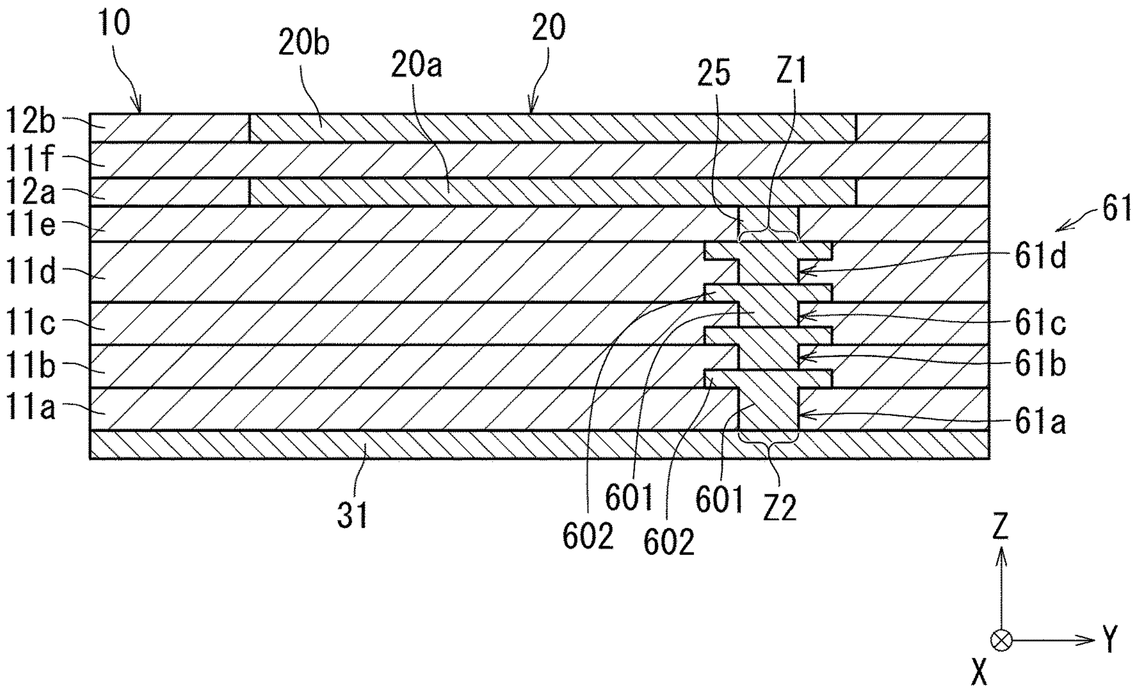
FIG. 5 is an enlarged sectional view of first extended wiring and surroundings thereof.

FIG. 5 is an enlarged sectional view of the first extended wiring 61 and surroundings thereof. FIG. 5 illustrates magnetic layers 12*a* and 12*b* omitted in FIG. 2. The magnetic layer 12*a* is placed in the same layer as the coil wiring layer 20*a* and the magnetic layer 12*b* is placed in the same layer as the coil wiring layer 20*b*.

As illustrated in FIG. 5, the first extended wiring 61 has a first zone Z1 in contact with the coil 20 and a second zone Z2 in contact with the first outer electrode 31. Viewed from Z direction, the first zone Z1 and the second zone Z2 overlap. It is sufficient if at least a portion of the first zone Z1 and at least a portion of the second zone Z2 overlap.

The first extended wiring 61 includes the plurality of extended wiring layers 61*a* to 61*d* stacked in Z direction. The extended wiring layers 61*a* to 61*d* each include a first portion 601 extending in Z direction and a second portion 602 connected to an upper surface of the first portion 601 and extending in a direction that is orthogonal to Z direction. In a section including Z direction, a width of the second portion 602 is wider than a width of the first portion 601.

Viewed from Z direction, the first portions 601 of the extended wiring layers 61*a* to 61*d* overlap for all the extended wiring layers 61*a* to 61*d*. It is sufficient if at least portions of the first portions 601 of the extended wiring layers 61*a* to 61*d* overlap for all the extended wiring layers 61*a* to 61*d*.

According to an above configuration, the plurality of extended wiring layers 61*a* to 61*d* are linearly placed along Z direction. Thus, an electrical path of the first extended wiring 61 can be made shorter so that electrical resistance of the first extended wiring 61 can be reduced. Incidentally, the configuration of the first extended wiring 61 has been described in FIG. 5 and a configuration of the second extended wiring 62 may be similar thereto.

(First Modification of Extended Wiring)

Figure 6:
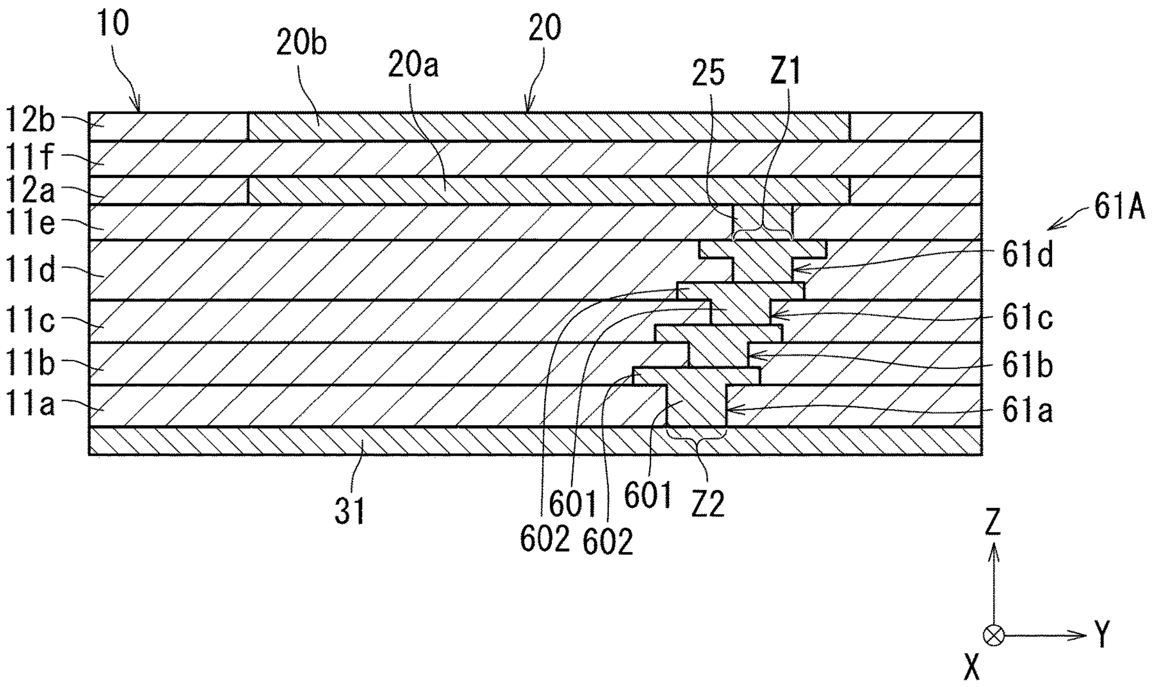
FIG. 6 is an enlarged sectional view illustrating a first modification of the first extended wiring.

FIG. 6 is an enlarged sectional view illustrating a first modification of the first extended wiring. FIG. 6 is different compared with FIG. 5 in a configuration of first extended wiring 61A.

In the first extended wiring 61A, as illustrated in FIG. 6, the first zone Z1 and the second zone Z2 do not overlap viewed from Z direction. To be specific, viewed from Z direction, the first portion 601 of the extended wiring layer 61*d* including the first zone Z1 is deviated from the first portion 601 of the extended wiring layer 61*a* including the second zone Z2 in a direction that is orthogonal to Z direction. In addition, all the first portions 601 are deviated in the direction that is orthogonal to Z direction, viewed from Z direction.

According to the above configuration, an extended wiring layer deviated in the direction that is orthogonal to Z direction exists among the plurality of extended wiring layers 61*a* to 61*d*. Thus, a stress that is caused by a difference in coefficient of linear expansion between the extended wiring layers and the magnetic layers can be dispersed. Therefore, exfoliation among the plurality of magnetic layers or occurrence of cracks can be reduced. Incidentally, the configuration of the first extended wiring 61A has been described in FIG. 6 and a configuration of second extended wiring is similar thereto.

(Second Modification of Extended Wiring)

Figure 7:
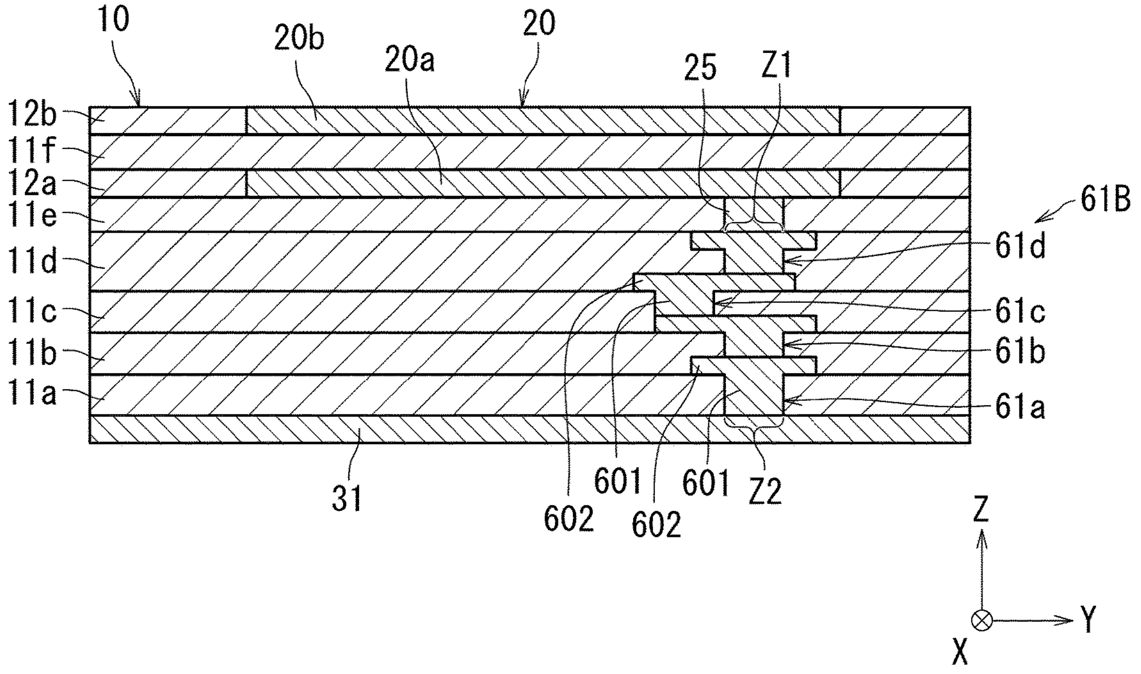
FIG. 7 is an enlarged sectional view illustrating a second modification of the first extended wiring.

FIG. 7 is an enlarged sectional view illustrating a second modification of the first extended wiring. FIG. 7 is different compared with FIG. 5 in a configuration of first extended wiring 61B.

In the first extended wiring 61B, as illustrated in FIG. 7, the first zone Z1 and the second zone Z2 overlap viewed from Z direction. It is sufficient if at least a portion of the first zone Z1 and at least a portion of the second zone Z2 overlap. To be specific, viewed from Z direction, the first portion 601 of the extended wiring layer 61*c* is deviated from the first portions 601 of the extended wiring layers 61*a*, 61*b*, and 61*d* in a direction that is orthogonal to Z direction. Incidentally, the first portion 601 of the extended wiring layer 61*b* may be deviated from the first portions 601 of the extended wiring layers 61*a* and 61*d* in the direction that is orthogonal to Z direction.

According to the above configuration, at least two extended wiring layers that overlap viewed from Z direction exist among the plurality of extended wiring layers 61*a* to 61*d*. Thus, an electrical path of the first extended wiring 61B can be made shorter so that electrical resistance of the first extended wiring 61B can be reduced.

Second Embodiment

Figure 8:
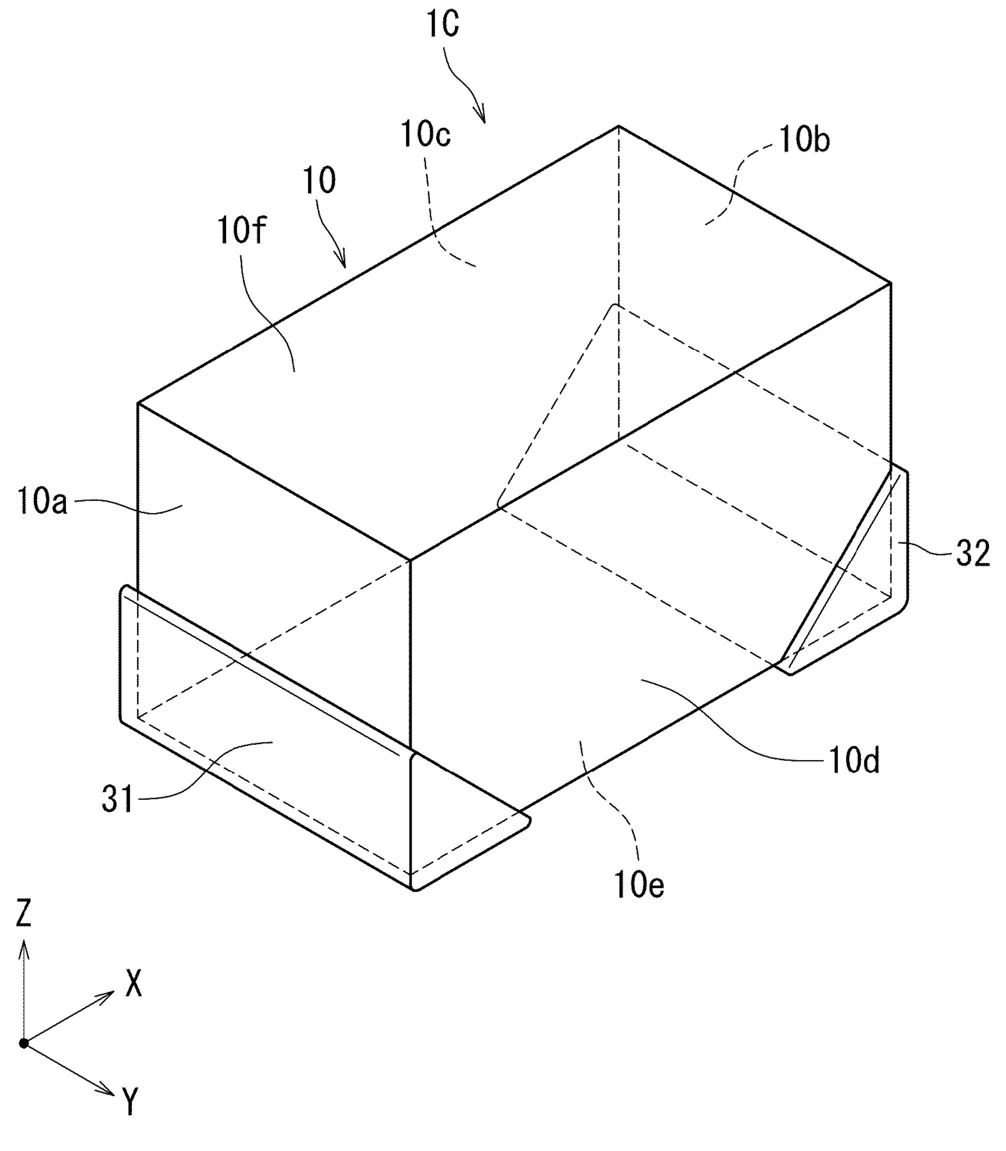
FIG. 8 is a perspective view illustrating a second embodiment of a coil component.
Figure 9:
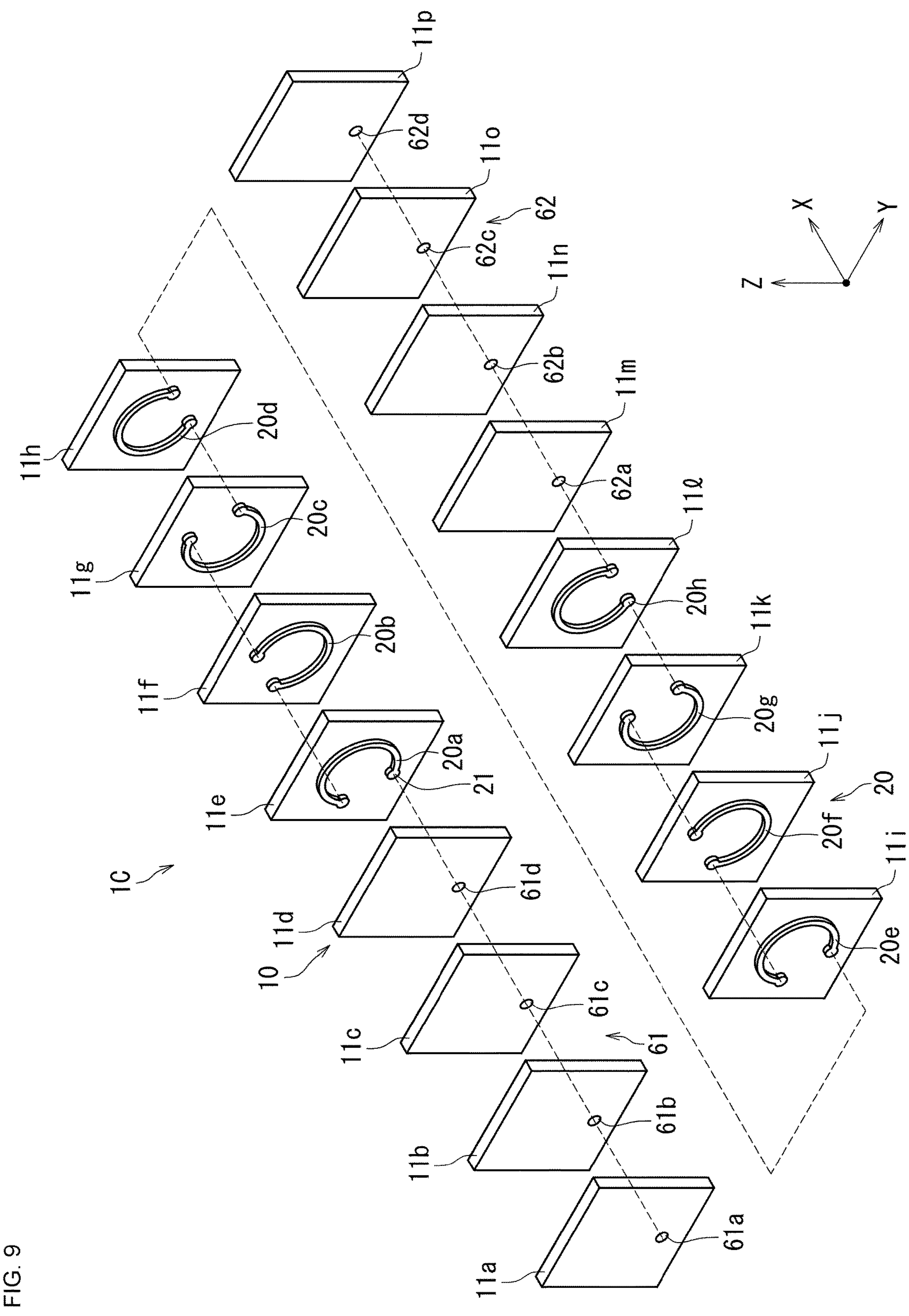
FIG. 9 is an exploded perspective view of the coil component.

FIG. 8 is a perspective view illustrating a second embodiment of a coil component. FIG. 9 is an exploded perspective view of the coil component. The second embodiment differs from the first embodiment in positions of the coil, the first extended wiring, and the second extended wiring. This different configuration will be described below. The other configurations are the same as the configurations of the first embodiment and are provided with the same reference characters as those of the first embodiment and description thereof is omitted.

In a coil component 1C of the second embodiment, as illustrated in FIGS. 8 and 9, the element body 10 includes a plurality of magnetic layers 11*a* to 11*p*. The plurality of magnetic layers 11*a* to 11*p* are sequentially stacked in X direction. In the second embodiment, X direction corresponds to an example of "first direction" disclosed in the claims. A reverse direction to X direction corresponds to an example of "second direction" disclosed in the claims. The first end surface 10*a* and the second end surface 10*b* correspond to an example of "surface located in the first direction or the second direction" disclosed in the claims. The first end surface 10*a* corresponds to an example of "first surface located in the second direction" disclosed in the claims. The second end surface 10*b* corresponds to an example of "second surface located in the first direction" disclosed in the claims. The bottom surface 10*e* corresponds to an example of "third surface located between the first surface and the second surface" disclosed in the claims.

The first outer electrode 31 is in a shape of a letter L formed continuously on a portion of the bottom surface 10*e* and a portion of the first end surface 10*a*. The second outer electrode 32 is in a shape of a letter L formed continuously on a portion of the bottom surface 10*e* and a portion of the second end surface 10*b*.

The coil 20 is spirally wound along X direction. The coil 20 includes a plurality of coil wiring layers 20*a* to 20*h*. The plurality of coil wiring layers 20*a* to 20*h* are sequentially stacked in X direction. The plurality of coil wiring layers 20*a* to 20*h* form a spiral along X direction by being serially connected with via wiring layers, not illustrated, interposed therebetween.

The coil wiring layers 20*a* to 20*h* are respectively placed on the magnetic layers 11*e* to 11*l*. The coil wiring layers 20*a* to 20*h* extend along directions that are orthogonal to X direction. The coil wiring layers 20*a* to 20*h* are each formed in a shape wound by less than one turn on a plane.

The first extended wiring 61, the coil 20, and the second extended wiring 62 are sequentially placed in X direction. The first extended wiring 61 is electrically connected to the first end portion 21 of the coil 20, extends at least in X direction, and is exposed from the first end surface 10*a* of the element body 10. The first extended wiring 61 is exposed from the first end surface 10*a* of the element body 10 and is connected to the first outer electrode 31. The second extended wiring 62 is electrically connected to the second end portion 22 of the coil 20, extends at least in X direction, and is exposed from the second end surface 10*b* of the element body 10. The second extended wiring 62 is exposed from the second end surface 10*b* of the element body 10 and is connected to the second outer electrode 32.

The first extended wiring 61 includes the plurality of extended wiring layers 61*a* to 61*d*. The plurality of extended wiring layers 61*a* to 61*d* are sequentially stacked in X direction. The plurality of extended wiring layers 61*a* to 61*d* are formed in a shape of a column along X direction by being serially connected. The plurality of extended wiring layers 61*a* to 61*d* are placed in layers that differ from the coil wiring layers 20*a* to 20*h* with respect to X direction.

The second extended wiring 62 includes the plurality of extended wiring layers 62*a* to 62*d*. The plurality of extended wiring layers 62*a* to 62*d* are sequentially stacked in X direction. The plurality of extended wiring layers 62*a* to 62*d* are formed in a shape of a column along X direction by being serially connected. The plurality of extended wiring layers 62*a* to 62*d* are placed in layers that differ from the coil wiring layers 20*a* to 20*h* with respect to X direction.

In this embodiment, the bottom surface 10*e* of the element body 10 configures a mount surface that is to be mounted on a mount substrate not illustrated. Accordingly, the plurality of magnetic layers 11*a* to 11*p* of the element body 10 are stacked in a direction that is parallel to the mount surface of the element body 10 (so-called transverse stacking), so that the coil component 1C which can be more easily designed so as to decrease in stray capacitance between the coil 20 and the extended wiring 61, 62 and the outer electrodes 31, 32 and which is superior in high frequency characteristics can be implemented, in comparison with a case where the plurality of magnetic layers 11*a* to 11*p* are stacked in a direction that is orthogonal to the mount surface (so-called longitudinal stacking).

Subsequently, a method of manufacturing the coil component 1C will be described. The coil component 1C of the second embodiment is manufactured as with the method of manufacturing the coil component 1 of the first embodiment. That is, the unbaked coil wiring layer zone is formed by the flat technique, the unbaked extended wiring layer zone on the side of the first extended wiring 61 is formed by the printing lamination technique, and the unbaked extended wiring layer zone on the side of the second extended wiring 62 is formed by the printing lamination technique. Then, a multilayer body is formed by stacking of the unbaked extended wiring layer zone on the side of the first extended wiring 61, the unbaked coil wiring layer zone, and the unbaked extended wiring layer zone on the side of the second extended wiring 62 in X direction. Then, the element body 10, the coil 20, the first extended wiring 61, and the second extended wiring 62 are formed by baking of the multilayer body. After that, the first outer electrode 31 and the second outer electrode 32 are formed on the surface of the element body 10, so that the coil component 1C is manufactured.

According to the embodiment, the thickness of the unbaked coil wiring layer can be increased because the paste-like unbaked coil wiring layer and the paste-like unbaked magnetic layer are provided in the same layer on the sheet-like unbaked magnetic layer, as with the first embodiment. Thus, the thickness of the coil wiring layer can be increased so that the electrical resistance of the coil can be reduced.

Meanwhile, steps can be simplified and manufacturing is facilitated because the paste-like unbaked extended wiring layer and the paste-like unbaked magnetic layer are provided in the same layer without provision of the sheet-like unbaked magnetic layer. Herein, the extended wiring extends at least in X direction from the end portion of the coil, is exposed from the surface of the element body that is located in X direction (or the reverse direction to X direction), and accordingly, does not mainly extend in a direction that is orthogonal to X direction, unlike the coil wiring layers. Therefore, there is little necessity to increase a thickness of the extended wiring layer in order to reduce electrical resistance of the extended wiring. Thus, the zone for which there is little necessity to reduce the electrical resistance can be manufactured by simple steps.

Accordingly, the method of manufacturing a coil component that enables reduction in the electrical resistance and simplification of the steps can be implemented by manufacturing of the unbaked coil wiring layer zone, which entails necessity to reduce the electrical resistance, in steps for increasing the thickness and manufacturing of the unbaked extended wiring layer zones, which entail little necessity to reduce the electrical resistance, in the simple steps.

Though the unbaked extended wiring layer zone on the side of the first extended wiring 61, the unbaked coil wiring layer zone, and the unbaked extended wiring layer zone on the side of the second extended wiring 62 are combined after being manufactured in the different steps in the above manufacturing method, a step of forming the unbaked extended wiring layer zone on the side of the first extended wiring 61 may be carried out after the step of forming the unbaked coil wiring layer zone. The step of forming the unbaked extended wiring layer zone on the side of the first extended wiring 61 includes providing a paste-like unbaked extended wiring layer on an upper surface of a paste-like unbaked coil wiring layer. Accordingly, the unbaked coil wiring layer zone is formed before formation of the unbaked extended wiring layer zones and thus variation in electrical characteristics (such as inductance value) can be reduced with stabilization of the shapes of the unbaked coil wiring layers.

At this time, the unbaked extended wiring layer zone on the side of the second extended wiring 62 may be manufactured in a different step and may be thereafter combined with the unbaked coil wiring layer zone. Alternatively, a step of forming the unbaked extended wiring layer zone on the side of the second extended wiring 62 may be carried out after the step of forming the unbaked coil wiring layer zone and the step of forming the unbaked extended wiring layer zone on the side of the second extended wiring 62 includes providing a paste-like unbaked extended wiring layer on an upper surface of a paste-like unbaked coil wiring layer.

Third Embodiment

Figure 10:
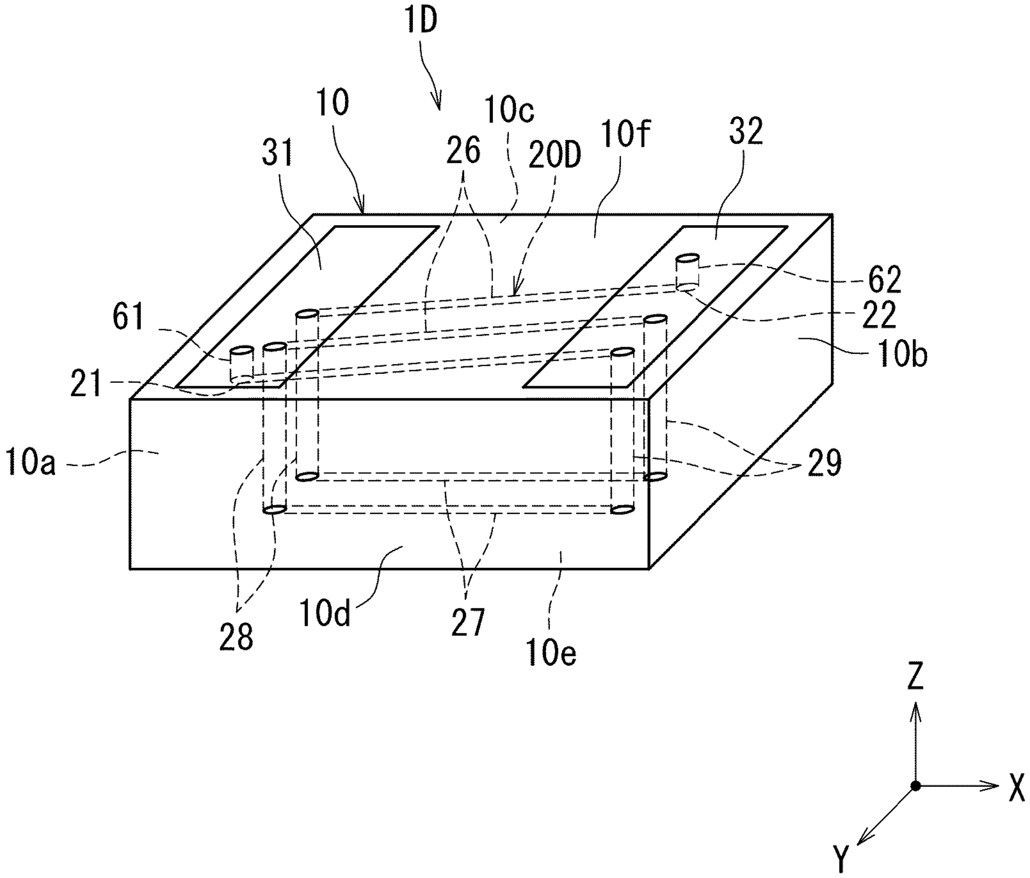
FIG. 10 is a perspective view illustrating a third embodiment of a coil component.
Figure 11:
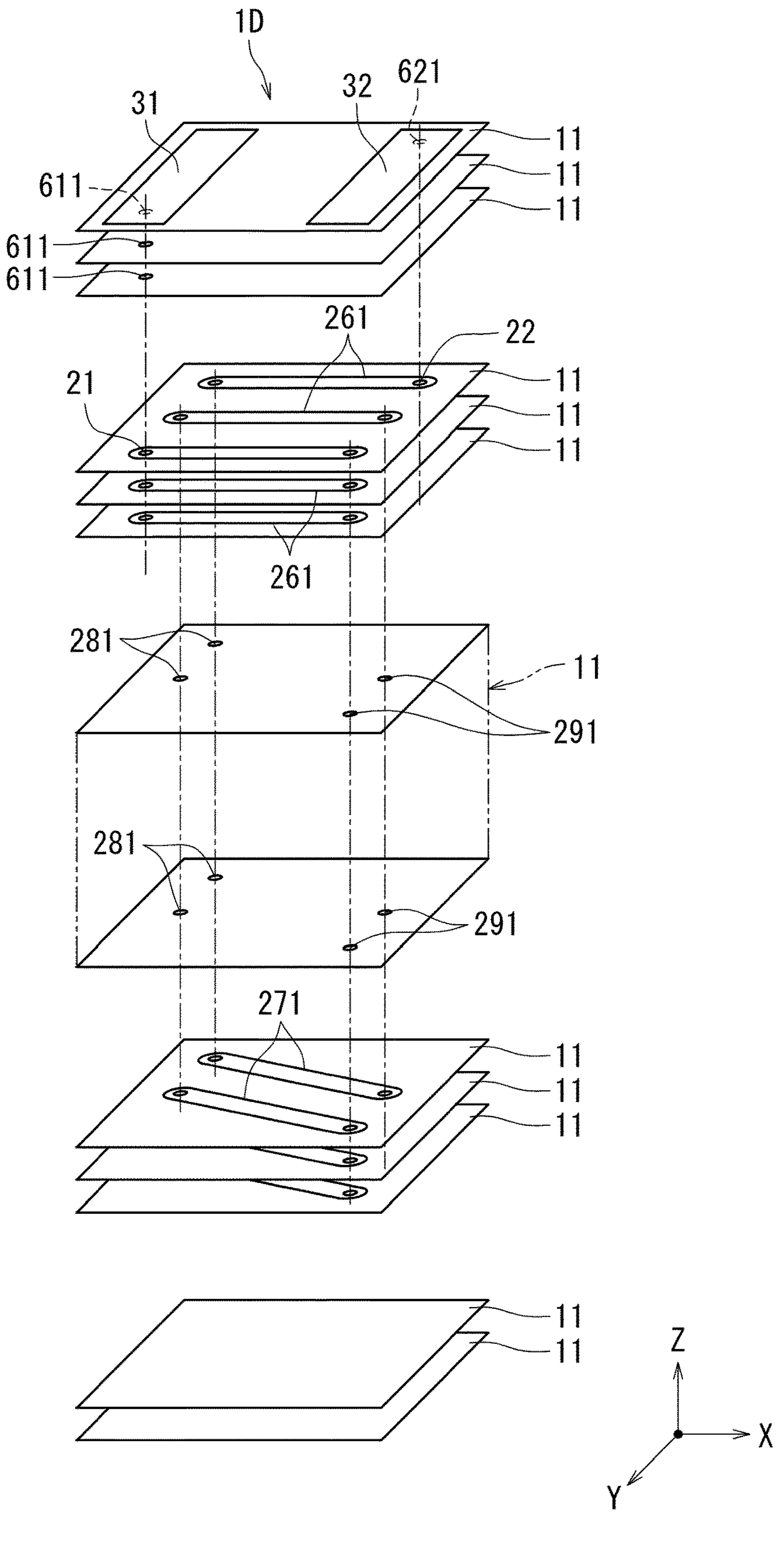
FIG. 11 is an exploded perspective view of the coil component.

FIG. 10 is a perspective view illustrating a third embodiment of a coil component. FIG. 11 is an exploded perspective view of the coil component. The third embodiment differs from the first embodiment in positions of the coil, the first extended wiring, and the second extended wiring. This different configuration will be described below. The other configurations are the same as the configurations of the first embodiment and are provided with the same reference characters as those of the first embodiment and description thereof is omitted.

In a coil component 1D of the third embodiment, as illustrated in FIGS. 10 and 11, the element body 10 includes the plurality of magnetic layers 11. The plurality of magnetic layers 11 are sequentially stacked in Z direction. In the third embodiment, Z direction corresponds to an example of "first direction" disclosed in the claims. A reverse direction to Z direction corresponds to an example of "second direction" disclosed in the claims. The bottom surface 10*e* and the top surface 10*f* correspond to an example of "surface located in the first direction or the second direction" disclosed in the claims. The bottom surface 10*e* corresponds to an example of "first surface located in the second direction" disclosed in the claims. The top surface 10*f* corresponds to an example of "second surface located in the first direction" disclosed in the claims.

In the coil component 1D of the third embodiment, the first extended wiring and the second extended wiring are placed in the same layers, the first extended wiring and the coil are sequentially placed in the second direction, the first extended wiring is exposed from the second surface of the element body and is connected to the first outer electrode, the second extended wiring is exposed from the second surface of the element body and is connected to the second outer electrode, and the second surface of the element body configures a mount surface.

To be specific, the first outer electrode 31 covers an end portion of the top surface 10*f* of the element body 10 on the side of the first end surface 10*a*. The second outer electrode 32 covers an end portion of the top surface 10*f* of the element body 10 on the side of the second end surface 10*b*.

A coil 20D is spirally wound along an axis of Y direction. The coil 20D includes a plurality of pieces of first coil wiring 26 provided on a plane on a side of the top surface 10*f* with respect to the axis, a plurality of pieces of second coil wiring 27 provided on a plane on a side of the bottom surface 10*e* with respect to the axis, a plurality of pieces of first penetrating wiring 28 provided on the side of the first end surface 10*a* with respect to the axis and extending in Z direction, and a plurality of pieces of second penetrating wiring 29 provided on the side of the second end surface 10*b* with respect to the axis and extending in Z direction.

The plurality of pieces of first coil wiring 26 are arrayed side by side in Y direction on the plane parallel to the top surface 10*f*. The plurality of pieces of second coil wiring 27 are arrayed side by side in Y direction on the plane parallel to the bottom surface 10*e*. The plurality of pieces of first penetrating wiring 28 are arrayed side by side in Y direction on the plane parallel to the first end surface 10*a*. The plurality of pieces of second penetrating wiring 29 are arrayed side by side in Y direction on the plane parallel to the second end surface 10*b*. The first coil wiring 26, the first penetrating wiring 28, the second coil wiring 27, and the second penetrating wiring 29 configure at least a portion of the spiral by being connected in order of mention.

The first coil wiring 26 includes a plurality of first coil wiring layers 261. The plurality of first coil wiring layers 261 are sequentially stacked in Z direction. The plurality of first coil wiring layers 261 are connected in parallel with via wiring layers, not illustrated, interposed therebetween. The first coil wiring layers 261 are respectively placed on the magnetic layers 11. The first coil wiring layers 261 extend along a direction that is orthogonal to Z direction.

The second coil wiring 27 includes a plurality of second coil wiring layers 271. The plurality of second coil wiring layers 271 are sequentially stacked in Z direction. The plurality of second coil wiring layers 271 are connected in parallel with via wiring layers, not illustrated, interposed therebetween. The second coil wiring layers 271 are respectively placed on the magnetic layers 11. The second coil wiring layers 271 extend along a direction that is orthogonal to Z direction.

The first penetrating wiring 28 includes a plurality of first penetrating wiring layers 281. The plurality of first penetrating wiring layers 281 are sequentially stacked in Z direction. The plurality of first penetrating wiring layers 281 are serially connected. The first penetrating wiring layers 281 are respectively placed so as to penetrate the magnetic layers 11. The first penetrating wiring layers 281 extend along Z direction.

The second penetrating wiring 29 includes a plurality of second penetrating wiring layers 291. The plurality of second penetrating wiring layers 291 are sequentially stacked in Z direction. The plurality of second penetrating wiring layers 291 are serially connected. The second penetrating wiring layers 291 are respectively placed so as to penetrate the magnetic layers 11. The second penetrating wiring layers 291 extend along Z direction.

The first extended wiring 61 and the second extended wiring 62 are placed in the same layers. The coil 20D and the first extended wiring 61 are sequentially placed in Z direction. The coil 20D and the second extended wiring 62 are sequentially placed in Z direction. The first extended wiring 61 is electrically connected to the first end portion 21 of the coil 20D, extends at least in Z direction, and is exposed from the top surface 10*f* of the element body 10. The first extended wiring 61 is exposed from the top surface 10*f* of the element body 10 and is connected to the first outer electrode 31. The second extended wiring 62 is electrically connected to the second end portion 22 of the coil 20D, extends at least in Z direction, and is exposed from the top surface 10*f* of the element body 10. The second extended wiring 62 is exposed from the top surface 10*f* of the element body 10 and is connected to the second outer electrode 32.

The first extended wiring 61 includes a plurality of extended wiring layers 611. The plurality of extended wiring layers 611 are sequentially stacked in Z direction. The plurality of extended wiring layers 611 are formed in a shape of a column along Z direction by being serially connected. The plurality of extended wiring layers 611 are placed in layers that differ from the coil wiring layers 261 and 271 with respect to Z direction.

The second extended wiring 62 includes a plurality of extended wiring layers 621. The plurality of extended wiring layers 621 are sequentially stacked in Z direction. The plurality of extended wiring layers 621 are formed in a shape of a column along Z direction by being serially connected. The plurality of extended wiring layers 621 are placed in layers that differ from the coil wiring layers 261 and 271 with respect to Z direction.

In this embodiment, the top surface 10*f* of the element body 10 configures a mount surface that is to be mounted on a mount substrate not illustrated. Accordingly, the plurality of magnetic layers 11 of the element body 10 are stacked in a direction that is orthogonal to the mount surface of the element body 10 (so-called longitudinal stacking), so that flexure strength of the coil component 1D at time of mounting is increased in comparison with a case where the plurality of magnetic layers 11 are stacked in a direction that is parallel to the mount surface (so-called transverse stacking).

Subsequently, a method of manufacturing the coil component 1D will be described. The coil component 1D of the third embodiment is manufactured as with the method of manufacturing the coil component 1 of the first embodiment. That is, the unbaked coil wiring layer zone is formed by the flat technique and the unbaked extended wiring layer zone is formed by the printing lamination technique. Then, a multilayer body is formed by stacking of the unbaked coil wiring layer zone and the unbaked extended wiring layer zone in Z direction. Then, the element body 10, the coil 20D, the first extended wiring 61, and the second extended wiring 62 are formed by baking of the multilayer body. After that, the first outer electrode 31 and the second outer electrode 32 are formed on the surface of the element body 10, so that the coil component 1D is manufactured.

According to the embodiment, the thickness of the unbaked coil wiring layer can be increased because the paste-like unbaked coil wiring layer and the paste-like unbaked magnetic layer are provided in the same layer on the sheet-like unbaked magnetic layer, as with the first embodiment. Thus, the thickness of the coil wiring layer can be increased so that the electrical resistance of the coil can be reduced.

Meanwhile, steps can be simplified and manufacturing is facilitated because the paste-like unbaked extended wiring layer and the paste-like unbaked magnetic layer are provided in the same layer without provision of the sheet-like unbaked magnetic layer. Herein, the extended wiring extends at least in Z direction from the end portions of the coil, is exposed from the surface of the element body that is in Z direction, and accordingly, does not mainly extend in a direction that is orthogonal to Z direction, unlike the coil wiring layers. Therefore, there is little necessity to increase a thickness of the extended wiring layer in order to reduce electrical resistance of the extended wiring. Thus, the zone for which there is little necessity to reduce the electrical resistance can be manufactured by simple steps.

Accordingly, the method of manufacturing a coil component that enables reduction in the electrical resistance and simplification of the steps can be implemented by manufacturing of the unbaked coil wiring layer zone, which entails necessity to reduce the electrical resistance, in steps for increasing the thickness and manufacturing of the unbaked extended wiring layer zone, which entails little necessity to reduce the electrical resistance, in the simple steps.

Though the unbaked extended wiring layer zone and the unbaked coil wiring layer zone are combined after being manufactured in the different steps in the above manufacturing method, a step of forming the unbaked extended wiring layer zone may be carried out after the step of forming the unbaked coil wiring layer zone. The step of forming the unbaked extended wiring layer zone includes providing a paste-like unbaked extended wiring layer on an upper surface of a paste-like unbaked coil wiring layer. Accordingly, the unbaked coil wiring layer zone is formed before formation of the unbaked extended wiring layer zone and thus variation in electrical characteristics (such as inductance value) can be reduced with stabilization of the shapes of the unbaked coil wiring layers.

Incidentally, the present disclosure is not limited to the embodiments described above and may be modified in design to an extent that does not depart from purport of the disclosure. For instance, characteristic points of the first to third embodiments may be combined variously. Modification in design may be made for increase or decrease in numerical quantities of the coil wiring layers or the extended wiring layers.

In the first embodiment, the first outer electrode may be in a shape of a letter L formed continuously on the bottom surface and the first end surface. Further, the first outer electrode may be a five-sided electrode formed continuously on the first end surface, the bottom surface, the top surface, the first side surface, and the second side surface.

In the first embodiment, the second outer electrode may be in a shape of a letter L formed continuously on the bottom surface and the second end surface. Further, the second outer electrode may be a five-sided electrode formed continuously on the second end surface, the bottom surface, the top surface, the first side surface, and the second side surface.

What is claimed is:

1. A method of manufacturing a coil component, the coil component including:

an element body including a plurality of magnetic layers stacked in a first direction and having a surface in the first direction or in a second direction that is opposite to the first direction;

a coil in the element body;

extended wiring in the element body, electrically connected to an end portion of the coil, extending at least in the first direction, and exposed from the surface of the element body; and an outer electrode which is at least on the surface of the element body and connected to the extended wiring, in which the coil includes a coil wiring layer extending in a direction that is orthogonal to the first direction, and the extended wiring includes an extended wiring layer in a layer that is different from the coil wiring layer with respect to the first direction, the method comprising:

forming an unbaked coil wiring layer zone by providing a paste-like unbaked coil wiring layer and a paste-like unbaked magnetic layer in a same layer in the direction that is orthogonal to the first direction on an upper surface of a sheet-like unbaked magnetic layer with respect to the first direction; and forming an unbaked extended wiring layer zone by providing a paste-like unbaked extended wiring layer and a paste-like unbaked magnetic layer in a same layer in the direction that is orthogonal to the first direction without providing a sheet-like unbaked magnetic layer.

2. The method of manufacturing the coil component according to claim 1, further comprising:

stacking the unbaked coil wiring layer zone and the unbaked extended wiring layer zone in the first direction.

3. The method of manufacturing the coil component according to claim 2, wherein the surface of the element body includes a first surface in the second direction, the extended wiring includes a first extended wiring and a second extended wiring, and the outer electrode includes a first outer electrode and a second outer electrode, the first extended wiring and the second extended wiring are arranged in a same layer, and the first extended wiring and the coil are sequentially arranged in the first direction, the first extended wiring is exposed from the first surface of the element body and is connected to the first outer electrode, and the second extended wiring is exposed from the first surface of the element body and is connected to the second outer electrode, and the first surface of the element body defines a mount surface.

4. The method of manufacturing the coil component according to claim 2, wherein the surface of the element body includes a first surface in the second direction and a second surface in the first direction, and the element body includes a third surface between the first surface and the second surface, the extended wiring includes a first extended wiring and a second extended wiring, and the outer electrode includes a first outer electrode and a second outer electrode, the first extended wiring, the coil, and the second extended wiring are sequentially arranged in the first direction, the first extended wiring is exposed from the first surface of the element body and is connected to the first outer electrode, and the second extended wiring is exposed from the second surface of the element body and is connected to the second outer electrode, and the third surface of the element body defines a mount surface.

5. The method of manufacturing the coil component according to claim 2, wherein the extended wiring includes a plurality of the extended wiring layers stacked in the first direction, and a first zone in the extended wiring in contact with the coil and a second zone in the extended wiring in contact with the outer electrode do not overlap when viewed from the first direction.

6. The method of manufacturing the coil component according to claim 2, wherein the extended wiring includes a plurality of the extended wiring layers stacked in the first direction, and a first zone in the extended wiring in contact with the coil and a second zone in the extended wiring in contact with the outer electrode overlap when viewed from the first direction.

7. The method of manufacturing the coil component according to claim 2, wherein the extended wiring includes a plurality of the extended wiring layers stacked in the first direction, and portions of the plurality of extended wiring layers that extend in the first direction overlap for all the extended wiring layers, when viewed from the first direction.

8. The method of manufacturing the coil component according to claim 1, wherein the forming the unbaked extended wiring layer zone is performed after the forming the unbaked coil wiring layer zone, and the forming the unbaked extended wiring layer zone includes providing the paste-like unbaked extended wiring layer on an upper surface of the paste-like unbaked coil wiring layer.

9. The method of manufacturing the coil component according to claim 8, wherein the surface of the element body includes a first surface in the second direction, the extended wiring includes a first extended wiring and a second extended wiring, and the outer electrode includes a first outer electrode and a second outer electrode, the first extended wiring and the second extended wiring are arranged in a same layer, and the first extended wiring and the coil are sequentially arranged in the first direction, the first extended wiring is exposed from the first surface of the element body and is connected to the first outer electrode, and the second extended wiring is exposed from the first surface of the element body and is connected to the second outer electrode, and the first surface of the element body defines a mount surface.

10. The method of manufacturing the coil component according to claim 8, wherein the surface of the element body includes a first surface in the second direction and a second surface in the first direction, and the element body includes a third surface between the first surface and the second surface, the extended wiring includes a first extended wiring and a second extended wiring, and the outer electrode includes a first outer electrode and a second outer electrode, the first extended wiring, the coil, and the second extended wiring are sequentially arranged in the first direction, the first extended wiring is exposed from the first surface of the element body and is connected to the first outer electrode, and the second extended wiring is exposed from the second surface of the element body and is connected to the second outer electrode, and the third surface of the element body defines a mount surface.

11. The method of manufacturing the coil component according to claim 8, wherein the extended wiring includes a plurality of the extended wiring layers stacked in the first direction, and a first zone in the extended wiring in contact with the coil and a second zone in the extended wiring in contact with the outer electrode do not overlap when viewed from the first direction.

12. The method of manufacturing the coil component according to claim 8, wherein the extended wiring includes a plurality of the extended wiring layers stacked in the first direction, and a first zone in the extended wiring in contact with the coil and a second zone in the extended wiring in contact with the outer electrode overlap when viewed from the first direction.

13. The method of manufacturing the coil component according to claim 8, wherein the extended wiring includes a plurality of the extended wiring layers stacked in the first direction, and portions of the plurality of extended wiring layers that extend in the first direction overlap for all the extended wiring layers, when viewed from the first direction.

14. The method of manufacturing the coil component according to claim 1, wherein the surface of the element body includes a first surface in the second direction, the extended wiring includes a first extended wiring and a second extended wiring, and the outer electrode includes a first outer electrode and a second outer electrode, the first extended wiring and the second extended wiring are arranged in a same layer, and the first extended wiring and the coil are sequentially arranged in the first direction, the first extended wiring is exposed from the first surface of the element body and is connected to the first outer electrode, and the second extended wiring is exposed from the first surface of the element body and is connected to the second outer electrode, and the first surface of the element body defines a mount surface.

15. The method of manufacturing the coil component according to claim 14, wherein the extended wiring includes a plurality of the extended wiring layers stacked in the first direction, and a first zone in the extended wiring in contact with the coil and a second zone in the extended wiring in contact with the outer electrode do not overlap when viewed from the first direction.

16. The method of manufacturing the coil component according to claim 1, wherein the surface of the element body includes a first surface in the second direction and a second surface in the first direction, and the element body includes a third surface between the first surface and the second surface, the extended wiring includes a first extended wiring and a second extended wiring, and the outer electrode includes a first outer electrode and a second outer electrode, the first extended wiring, the coil, and the second extended wiring are sequentially arranged in the first direction, the first extended wiring is exposed from the first surface of the element body and is connected to the first outer electrode, and the second extended wiring is exposed from the second surface of the element body and is connected to the second outer electrode, and the third surface of the element body defines a mount surface.

17. The method of manufacturing the coil component according to claim 16, wherein the extended wiring includes a plurality of the extended wiring layers stacked in the first direction, and a first zone in the extended wiring in contact with the coil and a second zone in the extended wiring in contact with the outer electrode do not overlap when viewed from the first direction.

18. The method of manufacturing the coil component according to claim 1, wherein the extended wiring includes a plurality of the extended wiring layers stacked in the first direction, and a first zone in the extended wiring in contact with the coil and a second zone in the extended wiring in contact with the outer electrode do not overlap when viewed from the first direction.

19. The method of manufacturing the coil component according to claim 1, wherein the extended wiring includes a plurality of the extended wiring layers stacked in the first direction, and a first zone in the extended wiring in contact with the coil and a second zone in the extended wiring in contact with the outer electrode overlap when viewed from the first direction.

20. The method of manufacturing the coil component according to claim 1, wherein the extended wiring includes a plurality of the extended wiring layers stacked in the first direction, and portions of the plurality of extended wiring layers that extend in the first direction overlap for all the extended wiring layers, when viewed from the first direction.

* * * * *